INVENTORS.
LARRY A. GOSHORN
SHERRIL A. HARMON
BY
Ronald W. O'Keefe
ATTORNEY

Feb. 25, 1969 L. A. GOSHORN ET AL 3,430,209

MEMORY UTILIZATION APPARATUS AND METHOD

Filed Nov. 25, 1966 Sheet 2 of 15

| DECIMAL NUMBER | EQUIVALENT BINARY NUMBER |
|---|---|
| 0 | 000 |
| 1 | 001 |
| 2 | 010 |
| 3 | 011 |
| 4 | 100 |
| 5 | 101 |
| 6 | 110 |
| 7 | 111 |

FIG. 2

| BIT POSITION | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| BINARY NUMBER | 0 | 1 | 0 | 1 | 1 | 1 | 0 | 0 | 1 | 1 | 1 | 0 | 1 | 0 | 1 | 1 | 0 | 0 | 0 | 1 | 1 | 0 | 0 | 0 |
| EQUIVALENT OCTAL NUMBER | 2 | | | 7 | | | 1 | | | 6 | | | 5 | | | 4 | | | 3 | | | 0 | | |

FIG. 3

| COMMAND TYPE | OPERATION CODE (23 22 21) | OPERATION CODE (20 19 18) | INDEX BITS (17 16 15) | 14 | 13 12 11 10 9 8 7 6 5 4 3 2 1 0 |
|---|---|---|---|---|---|
| FULL OPERAND | | | | * | OPERAND ADDRESS |
| GEN 1 | 0 | 5 | | MICROCODED | |
| GEN 2 | 2 | 5 | | MICROCODED | |
| GEN 3 | 4 | 5 | | MICROCODED | |
| QUASI | 7 | 0-7 | | * | OPERAND ADDRESS |
| STEP FLOATING POINT | 0 | 1 | | MICROCODED | |

* RELATIVE ADDRESSING BIT

FIG. 4

Feb. 25, 1969 L. A. GOSHORN ET AL 3,430,209
MEMORY UTILIZATION APPARATUS AND METHOD
Filed Nov. 25, 1966 
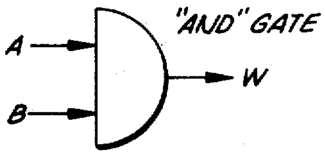
FIG. 8a
"AND" GATE TRUTH TABLE
| A | B | W |
|---|---|---|
| 0 | 0 | 0 |
| 1 | 0 | 0 |
| 0 | 1 | 0 |
| 1 | 1 | 1 |
FIG. 8b
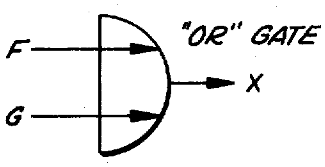
FIG. 9a
"OR" GATE TRUTH TABLE
| F | G | X |
|---|---|---|
| 0 | 0 | 0 |
| 1 | 0 | 1 |
| 0 | 1 | 1 |
| 1 | 1 | 1 |
FIG. 9b
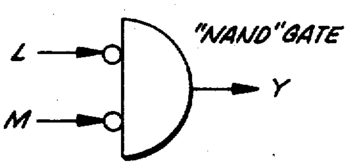
FIG. 10a
"NAND" GATE TRUTH TABLE
| L | M | Y |
|---|---|---|
| 0 | 0 | 1 |
| 0 | 1 | 1 |
| 1 | 0 | 1 |
| 1 | 1 | 0 |
FIG. 10b
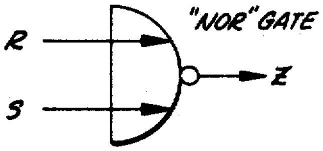
FIG. 11a
"NOR" GATE TRUTH TABLE
| R | S | Z |
|---|---|---|
| 0 | 0 | 1 |
| 1 | 0 | 0 |
| 0 | 1 | 0 |
| 1 | 1 | 0 |
FIG. 11b
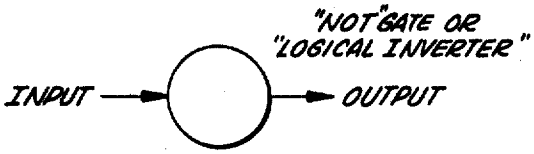
FIG. 12a
"NOT" GATE OR LOGICAL INVERTER" TRUTH TABLE
| INPUT | OUTPUT |
|---|---|
| 1 | 0 |
| 0 | 1 |
FIG. 12b

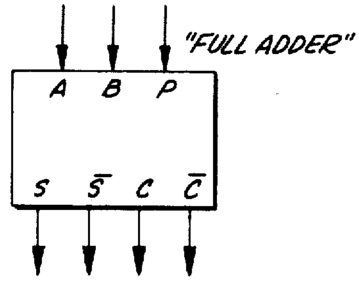
FIG. 13a
"FULL ADDER" CHARACTERISTIC TABLE
| A | B | P | S | $\bar{S}$ | C | $\bar{C}$ |
|---|---|---|---|---|---|---|
| 0 | 0 | 0 | 1 | 0 | 1 | 0 |
| 0 | 0 | 1 | 0 | 1 | 1 | 0 |
| 0 | 1 | 0 | 0 | 1 | 1 | 0 |
| 0 | 1 | 1 | 1 | 0 | 0 | 1 |
| 1 | 0 | 0 | 0 | 1 | 1 | 0 |
| 1 | 0 | 1 | 1 | 0 | 0 | 1 |
| 1 | 1 | 0 | 1 | 0 | 0 | 1 |
| 1 | 1 | 1 | 0 | 1 | 0 | 1 |
FIG. 13b
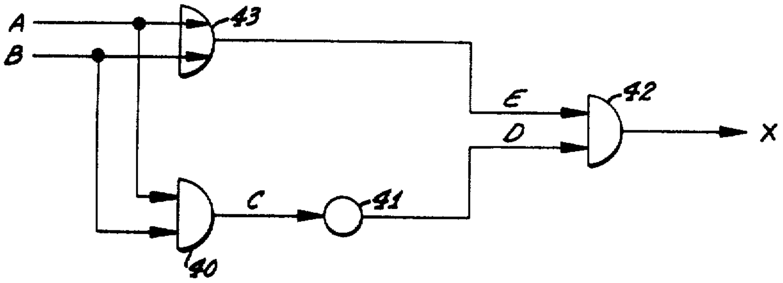
FIG. 14
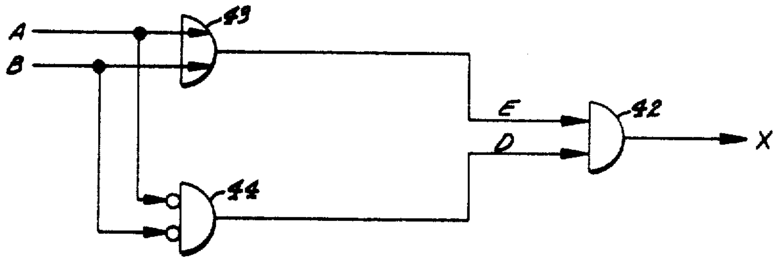
FIG. 15

| STATES OF TIME COUNTER SEQUENCE FLIP-FLOPS | | | TIMING SIGNALS WHICH ARE "ONE" | | EQUATIONS FOR THE PULSES WHICH ADVANCE THE TIME COUNTER TO ITS NEXT STATE |
|---|---|---|---|---|---|
| F1TCSA | F1TCSB | F1TCSC | | | |
| 0 | 0 | 0 | TT0E | TCTS | $(\overline{TCSA})(\overline{TCSB})(TCKA)$ |
| 0 | 0 | 1 | TT1E | | $(\overline{TCSA})(\overline{TCSB})(TCKA)$ |
| 0 | 1 | 0 | TT2E | | $(TT2E)(TCKA)(CDRA+\overline{MREQ}+IRMS)$ |
| 1 | 1 | 0 | TT3E | TCTA | $(TCKA)(TT3E)$ |
| 1 | 0 | 0 | TT4E | | $(TLPS)$ |

FIG. 17

NORMAL SEQUENCE CONTROL STATE 1

NORMAL SEQUENCE CONTROL STATE 2

Feb. 25, 1969 L. A. GOSHORN ET AL 3,430,209

MEMORY UTILIZATION APPARATUS AND METHOD

Filed Nov. 25, 1966 Sheet 11 of 15

OOM TIMING 3,430,209
MEMORY UTILIZATION APPARATUS AND METHOD

Larry A. Goshorn, Villa Park, Calif., and Sherrill A. Harmon, Phoenix, Ariz., assignors to General Electric Company, a corporation of New York Filed Nov. 25, 1966, Ser. No. 596,891
U.S. Cl. 340—172.5 4 Claims
Int. Cl. G11b *13/00*; G06f *7/00*

This invention relates to an electronic digital information processor and, more particularly, to apparatus for utilizing a memory storage location in a memory module comprising a component of the information processor as an accumulator register for an executory command.

Electronic information processing systems may be roughly divided, according to one set of criteria, into two basic groups; viz. non-real time and real time. The distinction is found mainly in the character of reaction required in response to detected contemporaneous events which occur either inside or outside an information processing system. A non-real time information processing system need not necessarily respond to the occurrence of an event within its influence time. Often, however, a real time information processing system must so respond to avoid undesirable or even catastrophic consequences which could otherwise follow the event.

An example of a real time information processing system is a process computer. Process computers are used to monitor and/or control industrial processes or the like. They are real time information processors because they are required to detect events and alter their information flow accordingly to provide output signals which may institute remedial action, sound alarms, or provide some other appropriate response within the influence time of the event. For example, a process computer may be utilized for controlling a steam turbine electric power generating unit for an electric utility. In such a control, unusual conditions on the output line may automatically cause the normal generator protection apparatus to remove the generator from the line. As a consequence, the prime moving turbine tends to speed up very quickly because it is no longer heavily loaded by, and frequency-slaved to, the power grid but is nonetheless still supplied with a vast amount of steam. To keep the turbine and generator from overspeeding, which could cause catastrophic damage, safety valves in the steam supply lines automatically open under these conditions. The process computer must detect these and a myriad of related events and respond quickly to restore the system to a safe condition by analyzing the events and their sequence and issuing appropriate output signals which may cause valves to be opened or closed, breakers to be actuated, alarms to be sounded, etc., to effect a complete shutdown or to prepare the unit for a restart.

In general, a typical process for which process computer control and/or monitoring is contemplated is characterized by the occurrence of many such events or sub-processes, some occurring continuously, some occurring periodically, and others occurring randomly. Hence, a real time information processor is required to perform many functions, seemingly simultaneously. However, a digital computer is by nature a serial device when considered at the instruction level; that is, it can perform its program steps only in a serial fashion, one by one. It is by virtue of the extreme speed at which it operates that a digital computer can be successfully employed in process control and/or monitoring applications. In order that a process computer program may be able to serve the functional needs of the controlled or monitored process, a priority system must be established for the many system functions. Simultaneous occurrence of certain combinations of events may then require a temporary reassignment of priorities. As a consequence of these requirements, real-time programs are distinctively different from their non-real time counterparts.

A real-time computer program becomes in reality a system of programs which service the process functions in accordance with an established priority scheme. These programs operate under an "executive control" program in such a manner that they interrupt one another as the changing process requirements dictate. There must, of course, be an underlying order in the seeming chaos which results from the interaction of so many programs. Thus, it is an inherent requirement of the executive control program that it perform efficiently a large amount of "bookkeeping" or "housekeeping" functions. Indeed, the housekeeping functions, necessary to some degree in all computer programs, prove to be of primary importance in a real time system program.

It becomes apparent that in the creation of real time information processing apparatus, cognizance must be given to the unique requirements of real time programs which distinguish them from programs written for non-real time information processing applications. At the same time, an advancement in the art which improves real time performance may find important utility in a non-real time environment where the advancement is one of time and/or power efficiency.

Frequently, as a process computer progresses through its program, occasion arises in which a single operation must be performed on a specific information word stored in the system main memory. Such an occasion may, for example, be a simple incrementation of the binary number stored in a specific memory storage location which functions as a totalizer for some cumulative signal input of the controlled and/or monitored process. In the past, such an operation has required the execution of a series of commands for consummation. Typically, the information word is called into a principal accumulator register of an arithmetic unit from its memory storage location by the execution of a first command, the required operation is performed by the execution of a second command, and the new or updated information word in the principal accumulator register is restored in the same memory storage location by the execution of a third command.

It is one object of this invention to provide apparatus to achieve the change to or the updating of such a stored information word by the execution of a single command.

If the information word temporarily held in the principal accumulator register is meaningful at an instant just prior to the time when the stored information word must be altered or updated, it has been necessary to save this information word by transferring it to a secondary accumulator register, or some suitable memory storage location, before the alteration to or updating of the stored information word. After the stored information word has been operated upon, the original contents of the principal accumulator register must be retrieved. Each of these functions has required the execution of an additional command for a total of five. The time expense is manifest and can be of great importance operationally in a real time information processing system.

It is, therefore, a further object of this invention to provide apparatus to achieve the change to or the updating of a stored information word by the execution of a single command, the execution of which command does not disturb the contents of the system principal accumulator register.

The foregoing objects are achieved, according to one embodiment of the instant invention, by providing apparatus responsive to signals decoded from an Operate on Memory (OOM) command word, which command word has an operand address portion specifying a memory storage location to be utilized as the principal accumulator register in executing an Operator Instruction stored in the next succeeding memory storage location from that in which the OOM instruction is stored as specified by a program location counter; and by the further provision of means whereby the decoded signals initiate a sequence of operations such that the original contents of the principal accumulator register are temporarily transferred to a secondary accumulator register, the contents of the memory storage location specified by the operand address portion of the OOM command word are placed in the principal accumulator register, the Operator Instruction is executed, the contents of the principal accumulator register after the execution of the Operator Instruction are stored into the memory storage location specified by the operand address portion of the OOM command word, and the contents of the secondary accumulator register are transferred back to the principal accumulator register.

The subject matter of the invention is particularly pointed out and distinctly claimed in the concluding portion of the specification. The invention, however, both as to organization and method of operation, may best be understood by reference to the following description taken in connection with the accompanying drawings in which:

FIGURE 2 is a table showing the relationship between decimal numbers and binary numbers;

FIGURE 3 is a table showing the relationship between binary numbers and octal numbers with reference to a word comprising twenty-four binary digits;

FIGURE 4 is a symbolic diagram illustrating the format of the various command words employed in the system of FIGURE 1;

FIGURE 8A is a logic symbol for an AND gate, and FIGURE 8B is a truth table for the AND gate of FIGURE 8A;

FIGURE 9A is a logic symbol for an OR gate, and FIGURE 9B is a truth table for the OR gate of FIGURE 9A;

FIGURE 10A is a logic symbol for a NAND gate, and FIGURE 10B is a truth table for the NAND gate of FIGURE 10A;

FIGURE 11A is a logic symbol for a NOR gate, and FIGURE 11B is a truth table for the NOR gate of FIGURE 11A;

FIGURE 12A is a logic symbol for a NOT gate or logical inverter, and FIGURE 12B is a truth table for the NOT gate or logical inverter of FIGURE 12B;

FIGURE 13A is a logic symbol for a serial full adder, and FIGURE 13B is a characteristic table for the serial full adder of FIGURE 13A;

FIGURE 14 is a logic diagram of a logic network which performs an Exclusive OR function;

FIGURE 15 is a logic diagram of an alternative logic network which performs an Exclusive OR function;

FIGURE 17 is a table showing the relationship between three Flip-Flops comprising a Sequence Time Counter in the timing logic area, the signals which issue from the Sequence Time Counter, and the logic equations of signals which advance the Sequence Time Counter from one state to the next;

Process computer system

Figure 1:
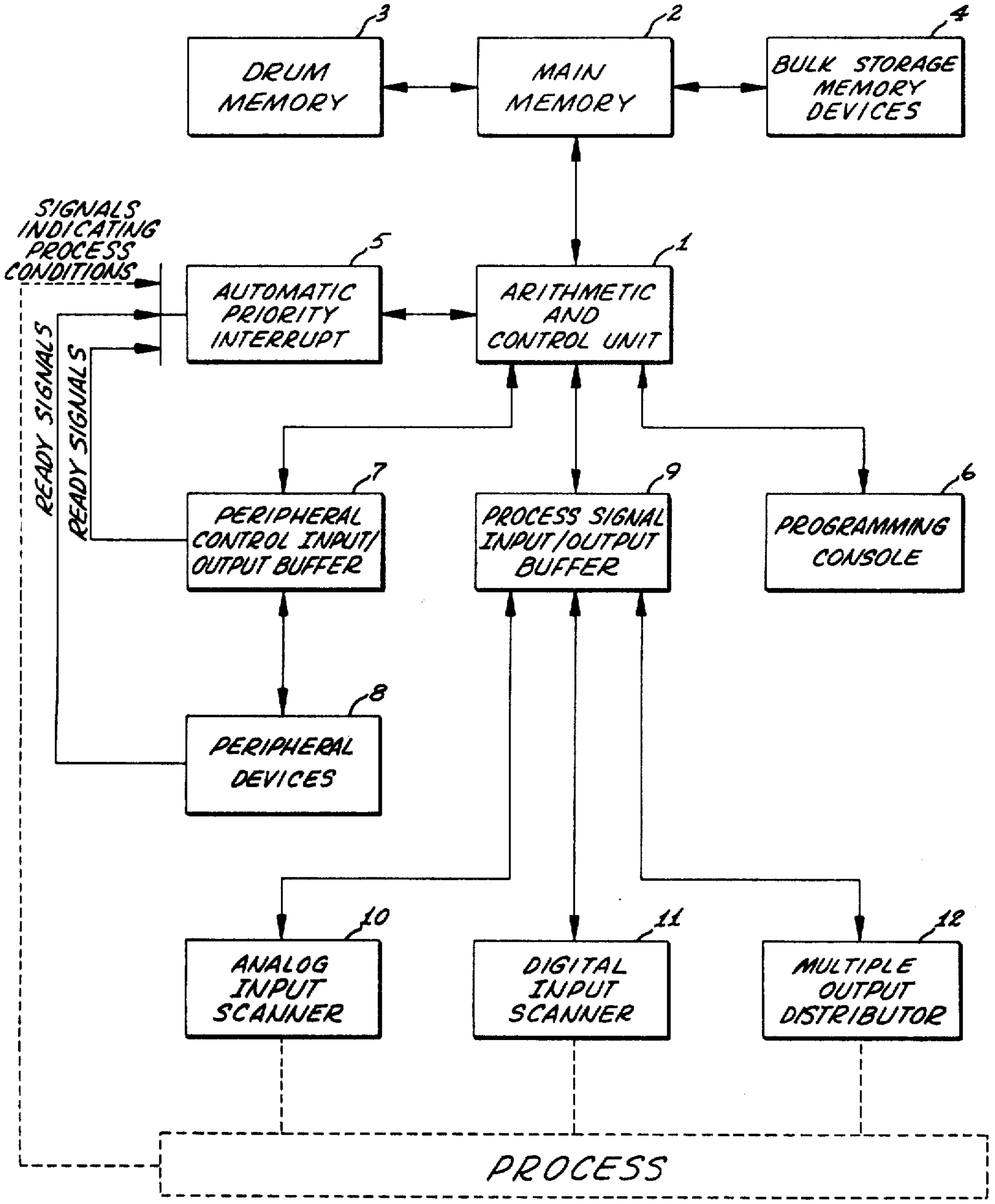
FIGURE 1 is a block diagram of an information processing system to which the instant invention is applicable.

A diagram showing the organization of a process computer system and its relationship to a controlled or monitored process is presented in FIGURE 1. An Arithmetic and Control Unit 1 performs calculations and other logical operations and also sequences and distributes information throughout the system. It supplies information to and receives information from a Main Memory module 2, an Automatic Priority Interrupt module 5, a Programming Console 6, a Peripheral Control Input/Output Buffer module 7, and a Process Signal Input/Output Buffer module 9.

The Main Memory module 2 typically, and in this case, contains a random access core storage characterized by its high speed capability. Appropriate control circuitry is provided to permit interchange of information with the Arithmetic and Control Unit 1, a Drum Memory 3, and such additional Bulk Storage Memory Devices 4 as may be required for a given system.

The Drum Memory 3 is a backup storage device for the Main Memory 2. It holds instruction routines and data which can be transferred into the Main Memory 2 upon demand. The Bulk Storage Memory Devices 4 are typically magnetic disk random access storage units and/or magnetic tape storage units used for massive storage of information to which the Arithmetic and Control Unit 1 need not have high speed access but which can be transferred into Main Memory 2 upon demand as may be required.

The Automatic Priority Interrupt module 5 detects and identifies "ready" signals from Peripheral Devices 8 that require testing at relatively long time intervals. A "ready" signal from a peripheral device indicates that it is physically ready to perform its normal function. For example, if a typewriter is "ready" to type, its power is on, its motor is up to speed, and it will have completed any previous request to type a character, i.e., the physical operations which occur within the typewriter to type a character will have been completed so that another character can be typed if required. The Automatic Priority Interrupt module is also used to detect signals which indicate condition changes in the controlled or monitored process. When an interrupt signal is detected, the Arithmetic and Control Unit 1 is alerted, and a program subroutine is initiated at an appropriate time by a program branch to a memory address supplied by the Automatic Priority Interrupt module to service the requesting interrupt according to its relative importance.

The Process Signal Input/Output Buffer module 9 is a communications link between the Arithmetic and Control Unit 1 and the controlled and/or monitored process input and output devices. It acts as a multiplexer for digital and analog inputs and as a multiplexer and amplifier for output signals. Signal inputs may be from contact closures, pulse generators, or measuring devices. The Arithmetic and Control Unit 1 uses the logic and equations stored in Main Memory 2 to decide whether any control or alarm actions are required. If corrective or alarm action is needed, the Arithmetic and Control Unit 1 provides the necessary information through the Process Signal Input/Output Buffer 9 to the digital and/or analog output circuits to change the process control variables or activate the proper alarm devices or displays. A plurality of Process Signal Input/Output Buffer modules may be provided to communicate with a single Arithmetic and Control Unit where the requirements of a specific system exceed the capacity of a single Process Signal Input/Output Buffer module.

The Analog Input Scanner 10 selects and amplifies process analog sensor signals. It also converts analog information into a digital form compatible with that used within the Arithmetic and Control Unit 1 and the other system modules. The Digital Input Scanner module 11 selects and conditions (filters, amplifies, attenuates) contact or digital process inputs. The Multiple Output Distributor module 12 selects and times digital, decimal, and analog outputs to the controlled and/or monitored process and to operator displays.

The Peripheral Control Input/Output Buffer module 7 communicates with the Arithmetic and Control Unit 1 and is used as a data buffer, translator, and sequencer for the various Peripheral Devices 8, which may include such Input/Output devices as typewriters, paper tape and card readers and punchers, etc. A plurality of Peripheral Control Input/Output Buffer modules may be provided to communicate with a single Arithmetic and Control Unit where the requirements of a specific system exceed the capacity of a single Peripheral Control Input/Output Buffer.

The Programming Console 6 provides manual communications with the Arithmetic and Control Unit 1 in machine language for programming and maintenance. In addition, the Programming Console 6 is provided with light displays which show the instantaneous states of various registers and elements within the Arithmetic and Control Unit 1 as an aid to monitoring the system and program performance and condition.

Information representation

The process computer system of FIGURE 1 stores and processes information represented by the binary code in which each digit must be a "one" or a "zero." For a brief explanation of this now commonly used code, one may refer to Chapter 1 of Digital Computer Design Fundamentals by Yaohan Chu, published in 1962 by the McGraw-Hill Publishing Company, Inc. The fundamental unit of information employed in the particular system described is a word of 24 binary digits. The first binary digit or bit of a word is termed the most significant bit and is designated as bit 23. The last binary digit is termed the least significant bit of the word and is designated as bit 0. The binary digits between bits 23 and 0 are accorded successively decreasing orders of significance.

Three general categories of words are employed in the system; viz.: (1) data words, (2) command words, and (3) auxiliary words for addressing and control. For convenience a binary word may be more compactly represented by a series of "octal" digits in which each octal digit defines 3 adjacent binary digits. As illustrated in FIGURE 2, any decimal number between zero and seven may be represented by three binary digits so that there are eight total combinations possible, hence the designation "octal." FIGURE 3 illustrates a 24-bit word and the equivalent octal number which represents the binary word given as an example. As will be explained below, the operation codes of the various types of command words are defined by bits 23–18 of the command words. The operation codes may therefore be denoted by two octal digits. A subscript 8 placed after a number indicates octal notation. A subscript 10 placed after a number indicates decimal notation.

The Main Memory module 2 of FIGURE 1 may utilize storage elements of the coincident-current magnetic core type. A brief explanation of magnetic core storage can be found at pages 106, 107, and 108 of Digital Computer Primer by E. M. McCormick, published in 1959 by the McGraw-Hill Book Company, Inc. For this specification, it need only be observed that words stored in the Main Memory module 2 are individually identified by a binary number which represents the address of a specific core cell or storage location in a three-dimensional magnetic core matrix where a desired information word, command word, or control word is stored. If the appropriate binary identification number or address is supplied to the Main Memory module 2, the Memory circuitry can retrieve or "fetch" the designated 24-bit word from the magnetic core storage location and make it available to the Arithmetic and Control Unit 1. The extraction of a previously stored information word from a core memory may change the magnetic state of individual cores and so destroy the information stored therein. Normal practice in the art is to provide automatic apparatus which immediately restores the same binary word in the same Memory core cell or storage location from which it has been fetched so that, in effect, extracting information from a Memory storage location does not change the information stored there.

Memory storage location addresses are often specified in octal notation. For example, the Memory storage location address 01110110101110 is more compactly identified as $16656_8$. It will be observed that, in this example, the binary number is 14 bits in length. For this reason, the most significant octal digit can never be higher than 3. If the binary number had been 13 bits in length, the most significant octal digit could never have been higher than 1. This follows from the conventional practice of dividing the binary word into octal digits by grouping from the least significant to the more significant bits.

The command or instruction words executed by the Arithmetic and Control Unit 1 are divided into six categories: Operand, GEN 1, GEN 2, GEN 3, Quasi, and Step Floating Point (SFP). The format of each of these command types is shown in FIGURE 4. As noted above, the operation codes for all commands are defined by the six most significant bits (23–18) of the command words. The operation code identifies the specific effect to be brought about by the performance of a command or instruction.

Full Operand commands, a sub-category of Operand commands, are the most commonly used. These commands, which are processed as if the Operand were contained by the entire word, are used to perform arithmetic operations, logical operations, index control operations, and data transfers to and from the Main Memory module 2. Bits 13–0 of these command words, the operand address portion, designate the address of the storage location in the Main Memory 2 containing information which is to be used or affected by executing the command. Bit 14 of the Full Operand command words, if a "one" brings about a modification to the operand address known as Relative Addressing which will be described below.

Gen 1 commands are differentiated from other command types by their unique operation code $05_8$. These commands are further sub-divided by the microcoding of bits 14–0 of the command word. GEN 1 commands are used primarily to effect bit manipulation within the principal accumulator register of the Arithmetic and Control Unit 1.

GEN 2 commands are differentiated from other commands by their unique operation code $25_8$. These commands are also sub-divided by the microcoding of bits 14–0 of the command word. GEN 2 commands are employed within the system to: (1) select modules and devices in the input/output equipment, (2) transfer data to or from these devices, and (3) provide for program control transfers as determined by various internal and external conditions to which the system is responsive.

GEN 3 commands are differentiated from other commands by their unique operation code $45_8$. These commands are also sub-divided by the microcoding of the bits 14–0 of the command word. GEN 3 commands are used to manipulate the contents of the principal and secondary accumulator registers and to affect other elements within the Arithmetic and Control Unit 1. GEN 3 commands are also used within Quasi subroutines for speeding up floating point arithmetic operations.

Quasi commands are identified by the presence of the number $7_8$ in bit positions 23 through 21 of the command word. These commands are utilized to initate Quasi subroutines which perform floating point arithmetic operations or other recurring special functions. The Main Memory 2 address of the first command word in a Quasi subroutine is defined within the operation code of the appropriate Quasi command.

SFP (Step Floating Point) commands are identified by their unique operation code $01_8$. They are used within the Quasi subroutines to implement and speed up floating point arithmetic operations. Bits 14–0 of the command words are microcoded to bring about bit manipulations within the Arithmetic and Control Unit 1 of unique significance to the performance of floating point operations.

Bits 17–15 of all command words, denoted the X, or index, bits, are reserved for indicating whether conventional index modification is to be performed on a command before its execution and, if index modification is specified, which index cell contains the modifying or index quantity which is to be the modifier. If bits 17–15 of a command word are all "zeros," no index modification will occur when the command word is transferred to the Arithmetic and Control Unit 1 for execution. If bits 15–17 are any other possible combination (001–111), index modification of the command word will take place by causing the contents of the designated Memory storage location ($00001–00007_8$) to be added to bit positions 15–0 of the command word. With the most often used command type, Full Operand, the result is normally a change in the operand address portion of the command word. With other command types, however, the command microcoding, and hence the operation to be performed, can be affected by index modification.

Where the total possible number of words which may be stored in the Main Memory module 2 exceeds the definition capability of that part (bits 13–0) of the Full Operand command words which specifies the operand address, a unique form of addressing is utilized to achieve extended addressing capability without increasing the fundamental word length of the information processing system. Bit 14 of Full Operand command words is reserved for specifying whether or not Relative Addressing is to be used with a command word which has been called into the Arithmetic and Control Unit 1 for execution. If bit 14 is a "one," Relative Addressing is specified, and the operand address portion of the command word will be modified arithmetically according to certain defined rules before it is executed such that the total range of addressable storage locations in the Main Memory module 2 is four times as great as that which could be specified by bits 13–0 without the relative addressing capability. If bit 14 is a "zero," Relative Addressing is not utilized, and the command word operand address is that specified directly by bits 13–0 subject to index modification as noted above.

Quasi command words can also be Relative Addressed although the result is not the same as that achieved with Full Operand command words. When a Quasi command word is executed and program control is transferred to the Memory storage location specified by the Quasi command word operation code portion, the binary number contained within the operand address portion is automatically transferred to a predetermined Memory storage location from which it can be extracted for use within the Quasi subroutine if necessary. When a Quasi command word is "Relative Addressed," the ultimate result is a change in the binary number placed into the predetermined Memory storage location rather than an actual change in an operand address per se.

Arithmetic and Control Unit

Figure 5:
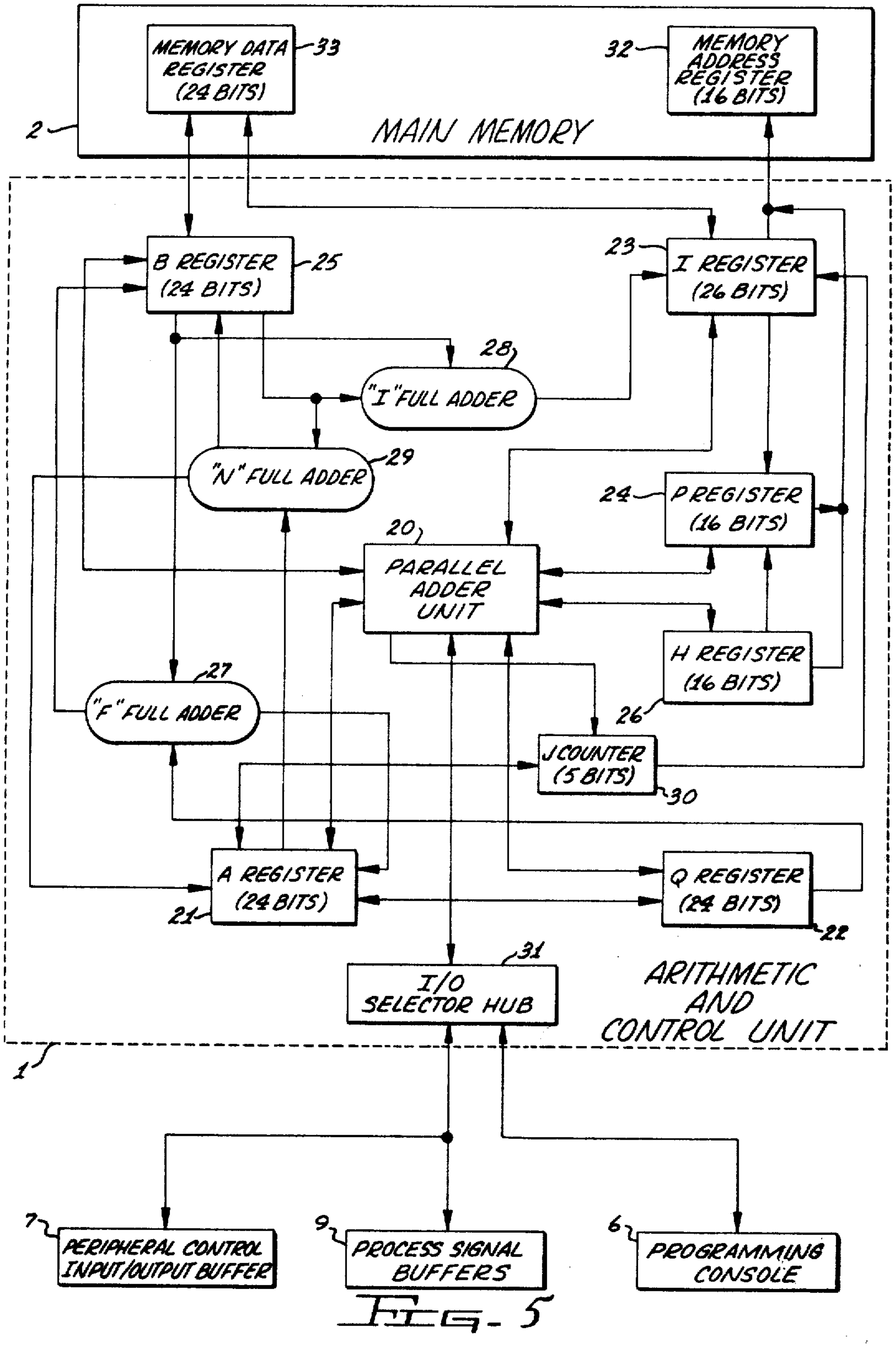
FIGURE 5 is a block diagram of the arithmetic and control unit utilized in the information processing system of FIGURE 1.

FIGURE 5 is a simplified block diagram of the Arithmetic and Control Unit (henceforth, Arithmetic Unit) 1 and the registers within the Main Memory module 2 with which it is in direct communication. The block diagram indicates the functional relationship between the several registers, a Parallel Adder Unit, and three serial full adders. Transfer of information between registers and other elements of the Arithmetic Unit 1, as indicated by the interconnecting lines of FIGURE 5, is effected by parallel and/or serial transfer of binary digits from the source register or element to the receiving register or element. In the introductory description that follows, only the basic register characteristics and functions and the more usual information flow paths are discussed as a basis for more detailed and expanded discussion of the invention as the specification progresses.

The Parallel Adder Unit (henceforth PAU) 20 is a 24-bit parallel adder with simultaneous (look-ahead) carry propagation between each group of 4 bits which may be enabled or disabled as required. For a general discussion of parallel adder units with simultaneous carry propagation capability, one may refer to pages 390 and 391 of Digital Computer Design Fundamentals by Yaohan Chu and previously referred to in this specification. All parallel arithmetic operations within the Arithmetic Unit 1 are accomplished within the PAU 20. In addition to its arithmetic function, the PAU 20 serves as a "hub" for most parallel transfers of data between the other Arithmetic Unit 1 registers.

The A Register 21 is a 24-bit accumulator for arithmetic operations and bit manipulations. It is capable of either right or left serial shifting in addition to normal, parallel, information exchange with the PAU 20. Parallel transfer of information may be effected between a portion of the A Register 21 and the J Counter 30 for floating point operations. The A Register 21 is also capable of communicating with the Q Register 22, the "F" Full Adder 27, and the "N" Full Adder 29.

The Q Register 22 is a 24-bit auxiliary accumulator used in conjunction with the A Register 21 for double precision arithmetic operations. In addition, the contents of the Q Register 22 are used to define operative fields of the A Register 21 and/or B Register 25 during the performance of Field commands, another subcategory of Operand instruction words, in which only the specified fields (groups of one or more bits) of an information word are affected. The Q Register is also capable of left or right shifting and of normal parallel transfer of information to or from the PAU 20 and is capable of communicating with the "F" Full Adder 27.

The I (Instruction) Register 23 is a 26-bit register which holds the command word being executed at a given time. Two bits, A and B, are interposed between bits 14 and 13 of a standard 24-bit command word when in the I Register 23 to provide a 16-bit operand field for extended memory addressing. Information transferred to or from the I Register 23 normally moves in parallel although portions of the I Register 23 may be serially shifted under certain conditions. The I Register 23 is capable of communicating with the PAU 20, the P Register 24, the "I" Full Adder 28, the Memory Address Register 32, and the Memory Data Register 33.

The P (Program Location) Register 24 is a 16-bit register which normally specifies the address of the storage location in the Main Memory module 2 from which the next command to be executed is to be extracted. All information is transferred to and from the P Register 24 in parallel. The P Register 24 is capable of communicating with the Parallel Adder Unit 20, the I Register 23, the H Register 26, and the Memory Address Register 32.

The B Register 25 is a 24-bit parallel-entry buffer register disposed between the Main Memory module 2 and the processing registers of the Arithmetic Unit 1. All information passing to or from the storage locations in the Main Memory module 2 is routed through this register via the Memory Data Register 33. The B Register 25 is capable of being right shifted during the performance of certain commands with which the B Register 25 is utilized as a functional information processor as well as a buffer. Information is transferred between the B Register 25 and the PAU 20 in parallel. The B Register 25 is also capable of communicating with the "F" Full Adder 27, the "I" Full Adder 28, and the "N" Full Adder.

The H (Holding) Register 26 is a 16-bit register used primarily to provide temporary information storage during the execution of certain "extended function" commands. This register is capable of accepting parallel data from the PAU 20 and transferring parallel data to the PAU 20, the P Register 24, and the Memory Address Register 32.

The "F" Full Adder 27 is used to implement arithmetic and logical manipulation on fields specified by the Q Register 22 during the performance Field commands and also to update a portion of List Control Words during the execution of List commands which affect certain storage locations in specified portions of the Main Memory 2.

The "I" Full Adder 28 is used to compute, from information contained within List Control Words, the relative location of items to be removed or appended to lists stored in the Main Memory module 2 during the performance of List commands.

The "N" Full Adder 29 is used to implement arithmetic and logic manipulations of the A Register 21 and to update second and third portions of List Control Words during the performance of List commands.

The J Counter 30 is a 5-bit counter used to control information manipulation and certain aspects of timing during the execution of a number of commands which require counting in one form or another, some according to variable conditions.

The Input/Output (henceforth, I/O) Selector Hub 31 provides Arithmetic Unit communications with the Peripheral Control Input/Output Buffer 7, the Process Signal Input/Output Buffer 9, and the Programming Console 6. The I/O Selector Hub enables one of a plurality of selectable 24-bit I/O information channels during the execution of certain commands. All parallel data transfers from Input/Output devices are routed through the I/O Selector Hub 31 to the PAU 20 for further distribution within the Arithmetic Unit 1.

The Memory Address Register 32 is 16-bit register which is an integral part of the Main Memory module 2 rather than the Arithmetic Unit 1. However, it receives a 16-bit truncated word directly from the P, I, or H Registers of the Arithmetic Unit 1, which word specifies the Memory storage address for the next stored 24-bit word which is to be transferred from Main Memory 2 into the Arithmetic Unit 1 via the Memory Data Register 33.

The Memory Data Register 33 is also an integral part of the Main Memory module 2. It is a 24-bit register which holds any word just extracted from a Memory storage location in response to a specific address having been placed in the Memory Address Register 32 and a Memory request having been made by the Arithmetic Unit 1. The Memory Data Register 33 communicates with the B Register 25 and I Register 23 of the Arithmetic Unit.

Logic and logic combinations

In a fundamentally binary information processing system, any given signal representing a single bit of information must always be either true or false or, as it is more commonly expressed, either "one" or "zero." Ordinarily, these states are represented within an information processor, other than as stored in Memory devices, by two discrete voltage levels. For example, a voltage level of nominally five volts positive may correspond to a binary "one" signal, and a voltage level of nominally zero volts to a binary "zero." The choice of voltage levels is arbitrary except for the consideration of using specific types of logic circuitry which may be preferred or prescribed. It is not uncommon for the two discrete voltage levels which represent "one" and "zero" conditions to be different in different logic areas of an information processing system; that is to say, a system in which "ones" and "zeros" are normally represented by five volts positive and zero volts levels respectively may include areas in which conditions require a wider voltage disparity and, perhaps, a polarity inversion. These areas might have logic voltage levels, for example, of 18 volts negative for "ones" and six volts positive for "zeros." For these reasons, it is standard practice to explain binary logic systems in straightforward terms of "one" and "zero" conditions without excessive concern for the precise arbitrary voltages representing these conditions.

Temporary storage of a bit of information may be effected by deliberately setting a bistable device to one or the other of its stable states to represent a "one" or a "zero." The bistable device most widely used in electronic information processors is the well known "flip-flop." A flip-flop is said to be in either the "one" state or the "zero" state and has the capability of retaining a state into which it has been placed until it is operated upon and forced into its alternate state. A change of state of a flip-flop is normally brought about by applying a voltage pulse to a "set" or "clear" (sometimes called "reset") input. As a practical matter, a flip-flop is usually designed to respond to voltage transients so that a change of state occurs, according to design, on the trailing or leading edge of a voltage pulse applied to a flip-flop input.

The state of a flip-flop may be reflected in one or more outputs, and a flip-flop is usually provided with both "one" and "zero" outputs. Should a flip-flop be in the "one" or set state, the "one" output would be true and the "zero" output would be false. If positive five volts and zero volts represent "one" and "zero" signal levels within the local logic area of the system, the "one" output would be positive five volts and the "zero" output would be zero volts. On the other hand, if the flip-flop is in the "zero" or cleared state rather than set, the "one" output would be zero volts or false and the "zero" output would be positive five volts or true.

Figure 6A:
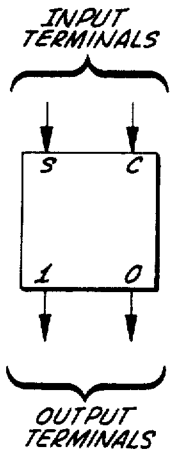
FIGURE 6A is a logic symbol for a Flip-Flop.
Figure 6B:
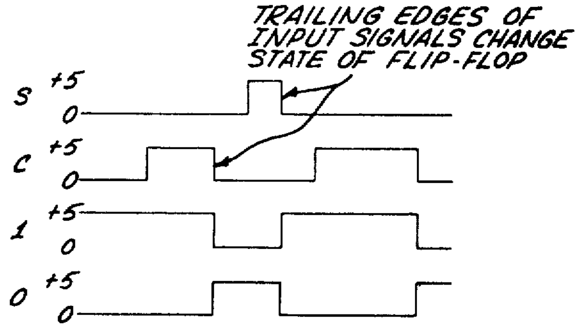
FIGURE 6B is a diagram showing the relationship between between the input and output signals of the Flip-Flop of FIGURE 6A.

FIGURE 6A shows a logic symbol for a flip-flop with its input and output terminals indicated. FIGURE 6B is a voltage/time diagram which illustrates the response characteristics of a flip-flop to set and clear pulses applied to the appropriate input terminals.

Information requiring a plurality of bits for definition may be temporarily stored in a group of flip-flops which make up a register. Hence, a 24-bit word may be placed in a 24-bit register, and the state of each flip-flop in the register may be ascertained by observing the voltage levels at the individual "one" and "zero" outputs. The flip-flops of a register may be interconnected to permit serial shifting of the information bits in unison to the next higher order or next lower order bit position relative to each. A brief explanation of serial shifting may be found on pages 95 and 96 of Digital Computer Primer by E. M. McCormick and previously referred to in this specification. Entry of information into a register may be performed serially or in parallel to each individual flip-flop in unison. The flip-flops of a register may also be interconnected such that the register functions as a counter to accumulate intermittent pulses from one or more pulses.

Figure 7A:
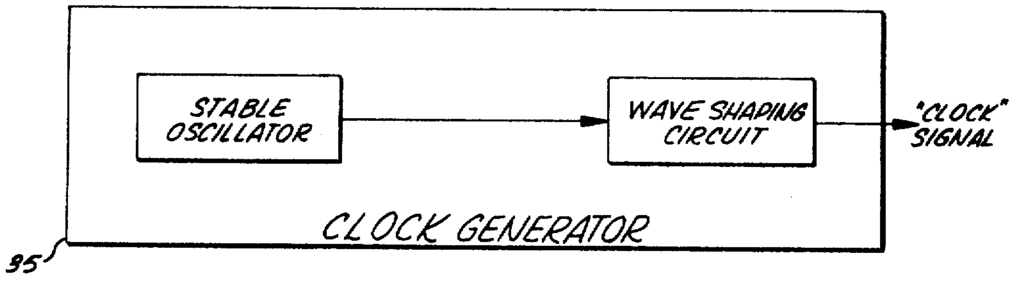
FIGURE 7A is a block diagram of a clock signal generator utilized in the information processing system of FIGURE 1.
Figure 7B:
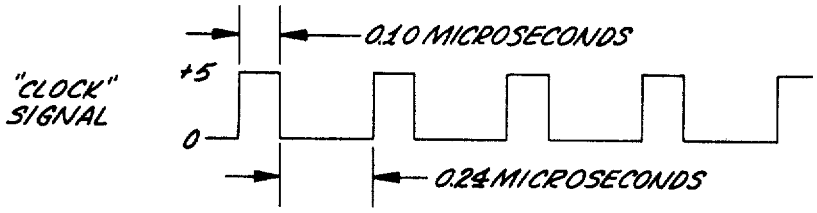
FIGURE 7B is a voltage/time diagram of the output of the clock signal generator of FIGURE 7A.

Movement of information between the registers of an information processor and many other related functions are performed in relative synchronism. A common time base generator is therefore required; and this conveniently may be a stable oscillator and a suitable wave shaping circuit to produce a train of regular, rectangular pulses often designated the "Clock." The "one" and "zero" positions of a Clock pulse train may be time symmetrical or asymmetrical as may be appropriate for the system which it governs. FIGURE 7A is a block representation of a Clock Generator 35, and FIGURE 7B is a diagram showing the time and voltage dimensions of a 2.94 megacycle Clock signal suitable for use in an information processing system with which the present invention may be practiced.

Generally, two or more output signals from flip-flops and/or other bistable devices such as switches are combined logically, sometimes with and sometimes without a Clock or other timing signals, by "gates" to provide input signals to other flip-flops and to provide gating signals which are logically combined with binary information signals to control information movement within the system, both as to path and as to relative time.

A gate has a single output which reflects logically the instantaneous state of its inputs. These inputs may, for logical design purposes, be any number required. Gates with certain distinctive characteristics are conventionally designated AND gates, OR gates, NAND gates, NOR gates, and NOT gates. Gates are represented in logic diagrams by standard symbols according to their characteristics, which characteristics may be summarized in a truth table for each type of gate. For example, a logic notation symbol for a two-input AND gate and its truth table are shown in FIGURES 8A and 8B, respectively. It will be observed that only when inputs A and B are both "ones" will the output W be a "one." If one or more of the inputs should change to "zero," the output would switch to "zero."

FIGURE 9A shows a logic notation symbol for a two-input OR gate and FIGURE 9B its truth table. It will be observed that if one or the other or both the inputs F and G is "one" then the gate output will be "one." If the inputs are all "zeroes," the output X will be "zero."

Equivalent logic notation symbols and their corresponding truth tables for NAND and NOR gates are shown in FIGURES 10A, 10B and 11A, 11B respectively.

Another element widely used in binary logic networks is the logical inverter which has a single input and a single output and, as its name implies, converts a "one" input to a "zero" output and a "zero" input to a "one" output. A logic notation symbol and truth table for the logical inverter are shown in FIGURES 12A and 12B. The logical inverter is also known as the NOT gate.

A three-input, four-output logic element known in the art as a "full adder" is represented by the logic notation symbol shown in FIGURE 13A. The characteristics of a full adder are summarized in a table presented in FIGURE 13B. The S and $\overline{S}$ outputs are complementary "sum" signals, and the C and $\overline{C}$ outputs are complementary "carry" signals. Full adders are used, often in conjunction with "carry" flip-flops, to perform binary arithmetic. It may be observed that the full adder characterized in FIGURE 13B "adds" in response to "zero" inputs rather than "one" inputs. This is merely a matter of circuit preference, and full adders responding to "one" input are also well known in the art.

In order to achieve meaningful and orderly movements of information between the various registers and other elements of an information processor, after a need for specific movements and combinations of movements has been established, gating signals must be generated or issued which permit the prescribed movements of information at the desired time and inhibit any undesirable movements of information at the same time. The exact manner in which a specific signal may be generated according to precisely defined conditions within a computer system at certain precisely defined times has become a matter of common knowledge within the art. Generally speaking, a signal issues, usually as a gate output, when all requisite conditions are satisfied in its logic chain. The conditions in a chain are themselves represented by other signals which may be individually dependent upon a higher order logic chain relative to the specific signal of interest. Alternatively, it is manifest that these higher order logic chains can simply be considered elements of the total set of conditions upon which the issuance of the ultimate signal depends. The origin of a given signal can thus be traced back to a unique set of conditions each of which depends upon the state of a bistable device at a given instant of time and which may or may not be logically combined with timing signals such as a Clock.

A unique mnemonic designation is conventionally assigned to each unique signal within a binary information processing system. In the present system, signals are identified by four character mnemonic designations. The Clock, for example, is designated TCKA. Following standard logic notation practice, a signal designated $\overline{\text{TCKA}}$ is the logical inversion of TCKA as indicated by the bar over the mnemonic. Whenever TCKA is "one," $\overline{\text{TCKA}}$ must be "zero"; and whenever TCKA is "zero," $\overline{\text{TCKA}}$ must be "one."

The set of conditions which must be fulfilled for a given signal to be "one" may be expressed by the classical logic or Boolean equation. The use of Boolean algebra to represent binary logic combinations has become so universally known and practiced in the art that it need not be discussed at length here. An elementary treatment, adequate for an understanding of this specification, may be found in Appendix A of Digital Computer Primer by E. M. McCormick, previously referred to in this specification. For a more extended discussion of Boolean algebra and its use in logical design, one may see chapters 3 and 4 of Digital Computer Design Fundamentals by Yaohan Chu and previously referred to in this specification.

It is of some importance to understand that what is commonly and conventionally designated a "signal" in a binary information processor is often conceptually both a signal and an electrical point where the signal is represented as a function of time by one of two discrete voltage levels. For this reason, a logic equation wherein a given signal is expressed in terms of other signals also defines the orientation and interconnection of logic elements, such as gates and inverters, by which the signal is generated. As an example, assume that a combination of logic elements is to produce a "one" output signal when either one, but not both, of two input signals A and B is "one." Further, assume a restriction to the use of AND gates, OR gates, and NOT gates to achieve the desired result.

A logic element combination that meets these requirements and restrictions is presented in FIGURE 14. If a "one" signal is present at either A or B, but not both, a "one" output will be realized at X, the output from AND gate 42. The AND gate 40 is not enabled since one or the other of its two enabling requirements has not been met, and, as a consequence, its output C is "zero." The NOT gate 41 converts this "zero" signal to a "one" signal at point D to enable one input of the AND gate 42. The OR gate 43 is enabled since it will respond to a "one" signal at either A or B to produce a "one" signal at E which enables the remaining input of the AND gate 42. If "one" signals are present at both A and B, a "zero" signal will appear at point X. The AND gate 40 will produce a "one" output at C since both its input signals are "one"; the NOT gate 41 will therefore produce a "zero" output at point D to disable one input of the AND gate 42. If "zero" signals are present at both A and B, a "zero" output will appear at point X. The OR gate 43 will be disabled since neither of its inputs is "one." The OR gate 43 will therefore produce a "zero" output at point E to disable one input of the AND gate 42.

The logic combination shown in FIGURE 14 is sometimes referred to as an EXCLUSIVE OR gate because of its one-or-the-other-but-not-both characteristic. The logical relationship of the signals employed in FIGURE 14 are defined by the equation $C=A\bar{B}+\bar{A}B$ which is read, according to conventional Boolean notation discussed in the above-cited references, as: C must be "one" when A but not B is "one" or when B but not A is "one."

If NAND gates are used, the logic element combination of FIGURE 15 will function in the same logical manner as that shown in FIGURE 14. The NAND gate 44 of the FIGURE 15 combination performs the functions of both the AND gate 40 and the NOT gate 41 of the FIGURE 14 combination.

The means by which a skilled logical designer, who is aware of which logic elements are available and of their characteristics, can determine the exact logic elements and exact interconnection required for a logic chain ending is a signal which has been defined by a logic equation is explained at length in many standard texts. One may refer to chapter 3 and, particularly chapter 4 of Digital Computer Design Fundamentals by Yaohan Chu and previously referred to in this specification. It is readily apparent from the above that the creation of a unique control signal defined in terms of other control and timing signals is well known in the art and no further explanation will be given here. In describing the invention, the more important control signals are defined in terms of their characteristics, and their origin is shown in blocks designated Instruction Decoding, Gating Signal Generation, and Timing.

Timing and normal Sequence Control States 1 and 2

Figure 16:
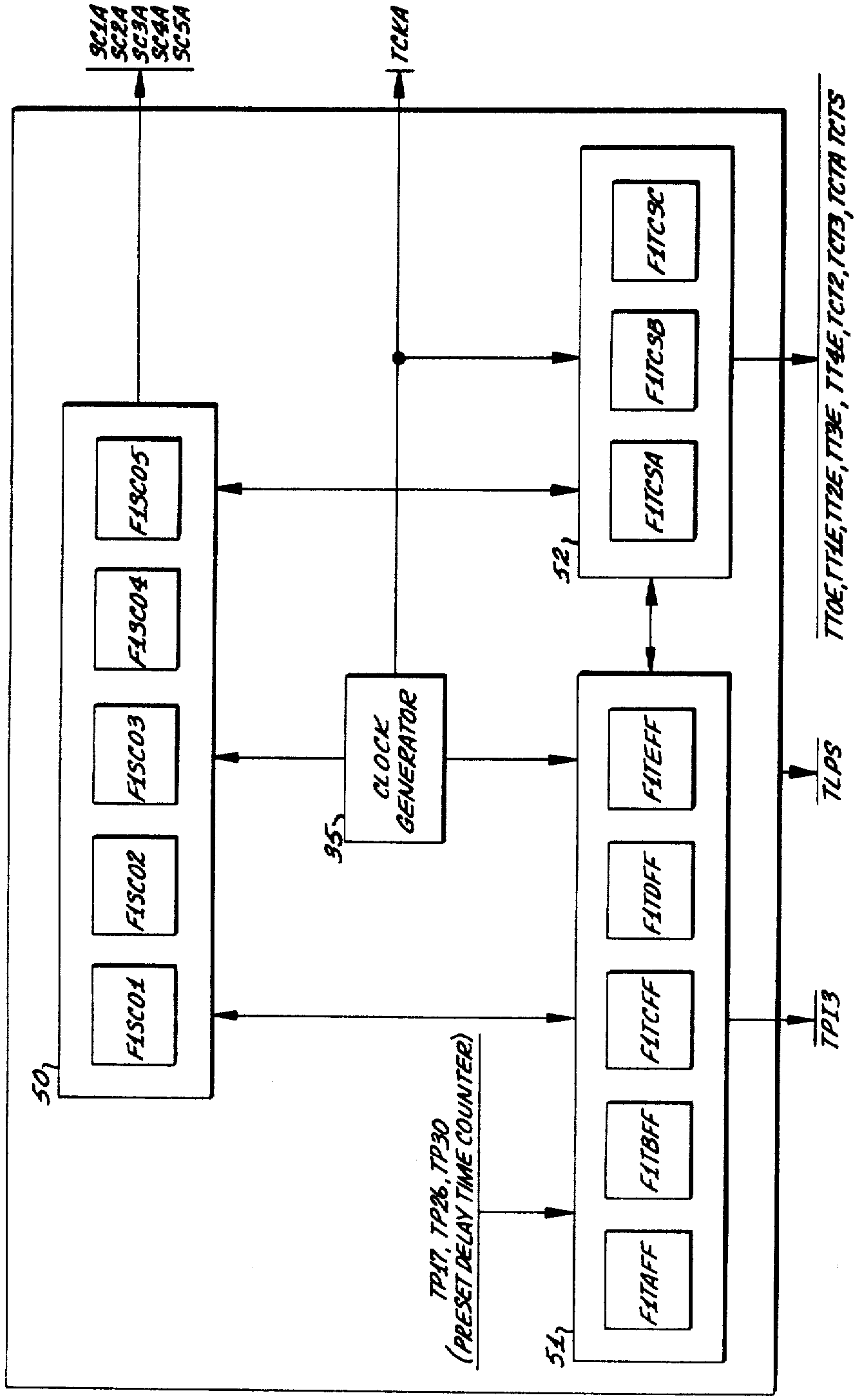
FIGURE 16 is a block diagram of the timing logic area of the arithmetic and control unit of FIGURE 5.

To maintain an orderly and efficient succession of operations within the Arithmetic Unit 1, Sequence Control logic 50 provides five mutually exclusive Sequence Control States which are defined by five Sequence Control Flip-flops designated F1SC01, F1SC02 F1SC03, F1SC04, and F1SC05 as shown in the Timing Block Diagram of FIGURE 16.

The Sequence Control State 1 Flip-flop F1SC01 defines the "fetch" cycle for all commands. The fetch cycle is that period during which a command stored in Main Memory 2 is requested, is transferred from Main Memory 2 to the Arithmetic Unit 1, and is routed into the I Register 23. In addition, the count in the P Register 24 is usually incremented during Sequence Control State 1, and other information movement among the registers may occur. A few commands which can be completed by a simple group of operations are completely executed during Sequence Control State 1. Relative Addressing, when specified by bit 14 of the command word, also occurs during Sequence Control State 1. Timing signal SC1A is "one" when the Sequence Control State 1 Flip-flop F1SC01 is set.

The Sequence Control State 2 Flip-flop F1SC02 defines the sequencing cycle when index modification occurs. In addition, Sequence Control State 2 is entered during the performance of several commands that utilize the X bits (17–15) of a command word for purposes other than normal index modification. Sequence Control State 2, when required, is normally entered immediately following Sequence Control State 1. Timing Signal SC2A is "one" when the Sequence Control State 2 Flip-flop F1SC02 is set.

The Sequence Control State 3 Flip-flop F1SC03 is used to provide additional bit manipulation time for a number of commands under certain conditions prior to further execution. The time extent of Sequence Control State 3 is determined by the requirements of the individual commands. Timing signal SC3A is "one" when the Sequence Control State 3 Flip-flop F1SC03 is set.

The Sequence Control State 4 Flip-flop F1SC04 defines the final execution state for most commands. Sequence Control State 4 is entered following Sequence Control State 1, 2, or 3 depending on the nature of the command being executed. Like Sequence Control State 3, Sequence Control State 4 may be time-extended as required for individual commands. Timing signal SC4A is "one" when the Sequence Control State 4 Flip-flop F1SC04 is set.

The Sequence Control State 5 Flip-flop F1SC05 defines a time period necessary for performing additional functions required to complete the execution of a few commands. Timing signal SC5A is "one" when the Sequence Control State 5 Flip-flop F1SC05 is set.

Figure 20:
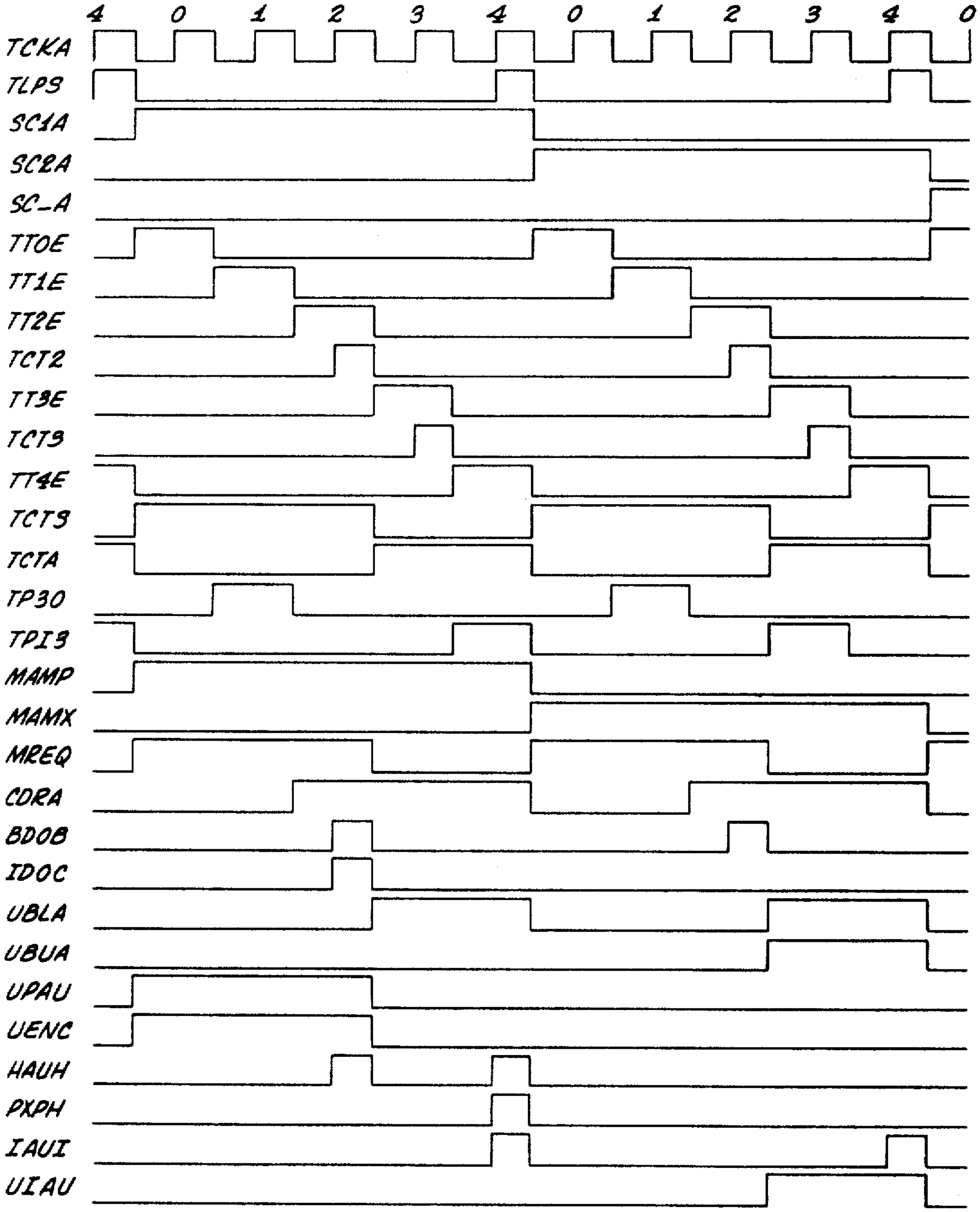
FIGURE 20 is a timing diagram illustrating the timing sequence of signals which effect the information movement indicated in FIGURES 18 and 19 and also illustrating the interrelationship of the timing signals generated in the timing logic area of FIGURE 16.

The timing control signals required for optimum operation within each Sequence Control State and for insuring timely changes from one Delay Control State to another are generated by a Sequence Time Counter 51 and a Sequence Time Counter 52 in conjunction with the Clock signal TCKA provided by the Clock Generator 35. In FIGURE 20 and subsequent timing diagrams, the Clock signal TCKA is drawn symmetrically for convenience rather than asymmetrically as in FIGURE 7B. The Sequence Time Counter 52 comprises three flip-flops: F1TCSA, F1TCSB, and F1TCSC. The timing signals decoded from the Sequence Time Counter 52 are tabulated in FIGURE 17 along with the logic equations for the counter advancing pulses which are developed in the logic immediately associated with the Sequence Time Counter 52.

The Delay Time Counter 51 comprises five Flip-flops: F1TAFF, F1TBFF, F1TCFF, F1TDFF, and F1TEFF. It is used to provide special control signals during the execution of commands requiring extension of the normal durations of Sequence Control States 3 and/or 4. The Delay Time Counter 51 is preset during Sequence Control States 3 and/or 4 of these commands to a count less than $30_8$ and is then incremented by the Clock signal TCKA. During all other Sequence Control States, the Delay Time Counter 51 is preset to $30_8$ and is inhibited from being incremented. A Delay Time Counter Complete signal TPI3 becomes "one" when the Delay Time Counter 51 count reaches $30_8$ and the Sequence Time Counter 52 is in the TT4E state. When this condition is attained, a Last Pulse signal TLPS is generated coincident with TCKA. The trailing edge of signal TLPS during any Sequence Control State clears the Sequence Time Counter 52, and the timing cycle for the next Sequence Control State is entered. At the trailing edge of signal TLPS of the final Sequence Control State for the execution of any command, Sequence Control State 1 is re-entered to initiate execution of the succeeding command.

The primary function of Sequence Control State 1 is to bring a command stored in Memory at an address specified by the contents of P Register 24 into the Arithmetic Unit 1 so that it may be decoded and executed. In addition, the P Register 24 is normally incremented during Sequence Control State 1 so that it will contain the address of the next command to be executed if the normal program sequence is followed. It may be noted here that certain conditions or commands can dictate a deviation from the straight instruction sequence provided by the P Register 24.

The primary purpose of Sequence Control State 2 is to implement conventional index modification when bits 15, 16, and 17 of a command word being executed are not all "zeros." This condition will have been detected during TCTA time of Sequence Control State 1 and appropriate signals generated so that Sequence Control State 2 is entered at the end of Sequence Control State 1.

Figure 18:
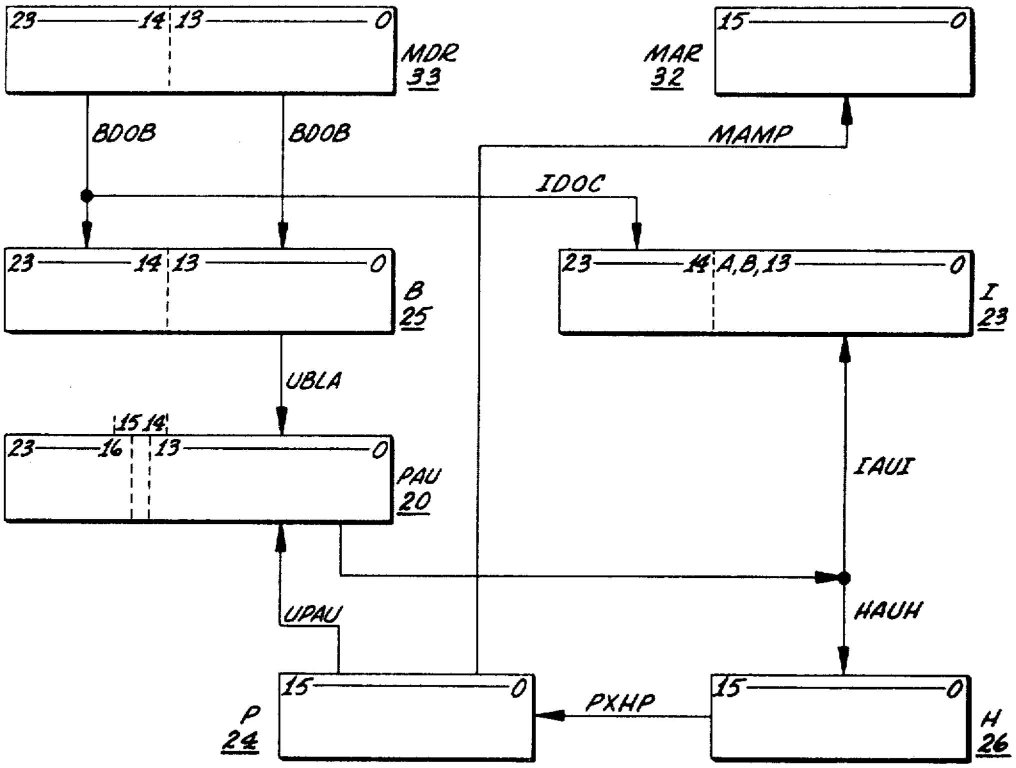
FIGURE 18 is a block diagram indicating the major information flow paths opened between various registers of the arithmetic and control unit of FIGURE 5 in a normal first sequence control state during the execution of a typical command.
Figure 19:
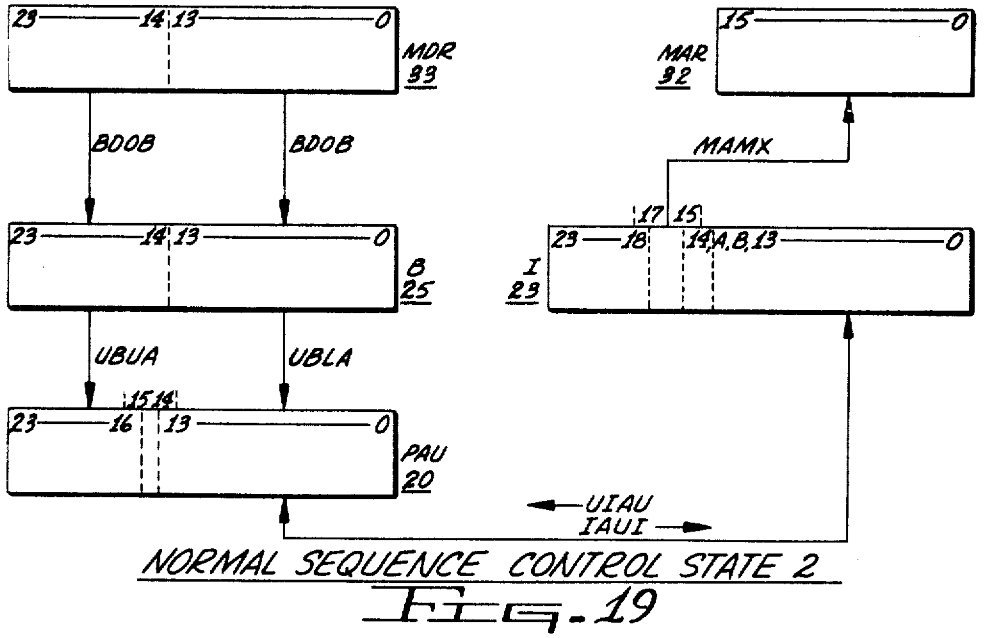
FIGURE 19 is a block diagram indicating the major information flow paths opened between various registers of the arithmetic and control unit of FIGURE 5 in a normal second sequence control state during the execution of a typical command.

The signals generated and the information flow scheme which takes place during Sequence Control States 1 and 2 is identical or nearly so for all commands. FIGURES 18 and 19 are block diagrams which indicate the information flow paths established during normal Sequence Control States 1 and 2, respectively; and FIGURE 20 is a timing diagram of the important gating signals which permit the proper paths to be established. In addition, the normal timing signals utilized within every Sequence Control State are included in the timing diagram of FIGURE 20.

Figure 21:
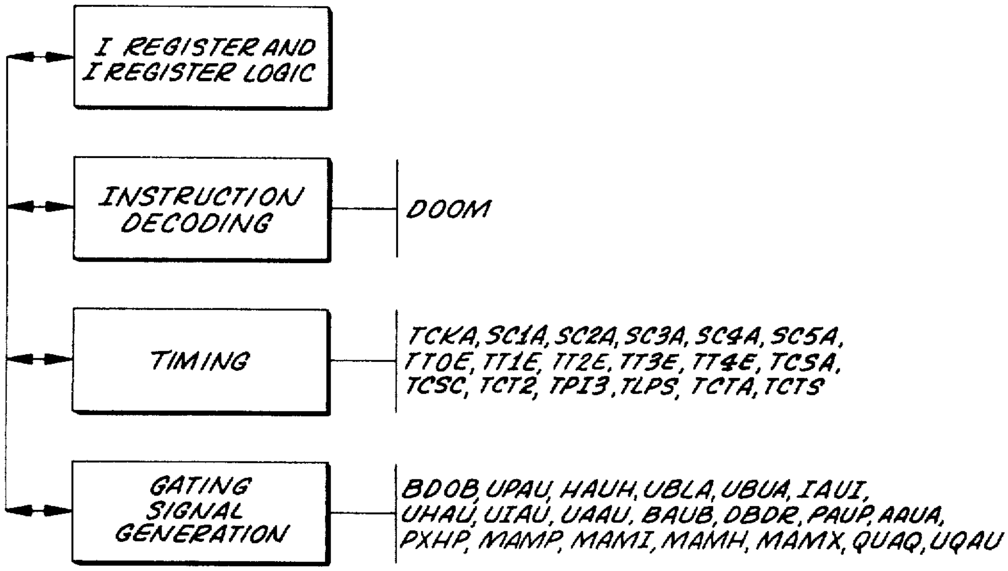
FIGURE 21 is a block diagram showing the major logic areas of the arithmetic and control unit of FIGURE 5 from which predetermined signals issue.

The operation and function of normal Sequence Control States 1 and 2 may best be understood by considering the following description in conjunction with FIGURES 1, 5, 18, 19, 20, and 21. FIGURE 21 is a block diagram showing the logic areas of the Arithmetic Unit 1 from which the more important signals issue.

It should be noted that the Main Memory module 2 operates asynchronously with the Arithmetic Unit 1. To fetch a stored command word, Sequence Control State 1 is entered, and the Main Memory module 2 is alerted that a request is being made by the MREQ signal as shown in the timing diagram, FIGURE 20. Simultaneously, the contents of the P Register 24 are gated to the Memory Address Register (MAR) 32 by the MAMP signal. The contents of the specified storage location in the Main Memory module 2 are fetched and placed into the Memory Data Register (MDR) 33 by the Main Memory module 2 logic functioning independently from the Arithmetic Unit 1. When the requested word is available from the Memory Data Register 33, the Main Memory module 2 generates a Data Ready signal CDRA to the Arithmetic Unit 1; and, during TCT2 time, the contents of the Memory Data Register 33 are gated to the B Register 25 by the BDOB signal. Additionally, Memory Data Register 33 bits 23–14 are gated to the I Register 23 bit positions 23–14 by the IDOC signal so that operation code decoding may commence. During TCTA time, B Register bits 13–0 are gated to bit positions 13–0 of the PAU 20 by the UBLA signal. At the trailing edge of signal TLPS during Sequence Control State 1, bits 15–0 of the PAU 20 are gated to bit positions A, B, 13–0 of the I Register 23 by the IAUI signal and to the H Register 26 by the HAUH signal.

Normal incrementation of the P Register 24 also occurs during Sequence Control State 1 and is brought about in the following manner without disturbing the information flow between the various Arithmetic Unit 1 elements. During TCTS time, the contents of the P Register 24 and a count of one are simultaneously gated to the PAU 20 by the UPAU and UENC signals, respectively. The output signals from the PAU 20 at this time represents the desired sum, $P+1$. This sum is gated to the H Register 26 by the HAUH signal which occurs during TCT2 time. At the trailing edge of signal TLPS, the contents of the H Register 26 are gated to the P Register 24 by the signal PXHP as the output signals from the PAU 20 bit position 15–0 are gated to the H Register by the HAUH signal.

Thus, at the end of a normal Sequence Control State 1, the I Register 23 contains the command which has been requested from Main Memory module 2, the P Register 24 count has been incremented by one, the operand address portion of the fetched command word is in the H Register 26 and the next required Sequence Control State may be entered to continue the execution of the command. It will be observed that the operation code portion of the command word is in the I Register 23 during TCTA time of Sequence Control State 1, and appropriate control signals generated from instruction decoding become available at that time to influence: (a) the remainder of Sequence Control State 1 (as required for a very few commands), (b) the Sequence Control State which will be entered next following signal TLPS, and (c) the action to be taken during the succeeding Sequence Control States.

Assuming that bits 17–15 of the command word of the instruction being executed are not all "zeros," Sequence Control State 2 will be entered following Sequence Control State 1. The signal MREQ again becomes "one" to indicate a request to the Main Memory module 2. Simultaneously, the contents of the I Register 23 bit positions 17–15 are gated to the Memory Address Register 32 bit positions 2–0 by the MAMX signal to specify the memory storage location indexing quantity is to be fetched. This is conveniently one of the low order memory storage locations 00001 to $00007_8$; therefore, the higher order bit positions of the Memory Address Register 32 are simply cleared by the MAMX signal. When the CDRA signal indicates that the requested modifying data is available from the Memory Data Register 33, its contents are gated to the B Register 25 by the DBOB signal during TCT2 time. During TCTA time, the contents of the B Register 25 are gated to the PAU 20 by the UBLA and UBUA signals. Simultaneously, the contents of the I Register 23 bit positions A, B, 13–0 are also gated to the PAU 20 by the UIAU signal. The output signals from the PAU 20 then represent the sum of the operand address portion of the command word present in the I Register 23 and the modifying word or index quantity stored in the specified index core cell. At the trailing edge of signal TLPS, the sum is gated from the PAU 20 bit positions 15–0 to the I Register 23 bit positions A, B, 13–0 by the IAUI signal, and the sequence control timing enters the next appropriate Sequence Control State according to the requirements of the individual command temporarily stored in the I Register 23. A few commands which affect or test the index cells use the index bits for instruction control and do not change the operand address portion of the command word.

In the following detailed description of the present invention, the assumption is made that the exemplary commands are not indexed in order that the timing charts do not become unnecessarily complex. It is to be understood, of course, that these commands can be index-modified in the manner just described.

The OOM (Operate On Memory) Full Operand command specifies a storage location in Main Memory 2 to function as if it were the A Register 21 for a command stored in the next sequential Memory storage location from that specified by the P Register 24 in calling the OOM command word into the Arithmetic Unit 1. This next sequential command following the OOM command may be called the "Operator Instruction." To consummate the OOM command, the Operator Instruction is executed without altering the contents of the A Register 21, and program control is transferred to the second sequential Memory storage location from that in which the OOM instruction is stored.

The OOM command requires five sequence control times to be serviced assuming that index modifications is not specified for either the OOM command or the Operator Instruction. The information movement which occurs among the various registers during the execution of an OOM command may best be understood by reference to the OOM timing chart, FIGURE 22, and the block diagrams FIGURES 23, 25, 26, and 27.

To aid in understanding the invention, an example is provided. For this example, the Operator Instruction is LDA which normally functions to load the A Register 21 with the contents of a Memory storage location specified by the LDA command word operand address portion.

Consider now that an OOM command word has been called into the Arithmetic Unit 1 from a Memory storage location specified by the P Register 24. A first Sequence Control State 1 is entered and proceeds in the normal manner described in detail above. Therefore, at the end of the first Sequence Control State 1, the I Register 23 will contain the OOM command word, the H Register 26 will contain the OOM command word operand address portion which specifies the Memory storage location (assume an address Z) which is to be utilized as the A Register 21, and the P Register 24 will have been incremented by a count of one.

A first Sequence Control State 4 is entered following the completion of the first Sequence Control State 1. The primary purposes of this first Sequence Control State 4 are to preserve the original contents of the A Register 21 by a temporary transfer of its contents to the Q Register 22 and to fetch the contents of the specified Memory storage location Z into the A Register 21. Referring again to the timing diagram FIGURE 22 and to FIGURE 23 which is a block diagram indicating the information movements occurring during this first Sequence Control State 4, it will be observed that the UAAU signal is "one" during TCTS time to gate the contents of the A Register 21 to the PAU 20 and that the QAUQ signal is "one" during TCT2 time to gate the output signals from the PAU 20 to the Q Register 22 to effect the transfer of the A Register 21 contents to the Q Register 22.

Memory is addressed from the I Register 23 during the whole of the first Sequence Control State 4 because the MAMI signal is "one." The operand address portion of the I Register 23 contains the Memory storage location address Z; therefore, when the contents of Z become available from the Memory Data Register 33, the BDOB signal becomes "one" at TCT2 time to gate the contents of the Memory Data Register 33 to the B Register 25. During TCTA time, the UBLA and UBUA signals become "one" to gate the contents of the B Register 25 to the PAU 20. The AAUA signal becomes "one" in synchronism with TLPS of the first Sequence Control State 4 to gate the output signals from the PAU 20 to the A Register 21. It will be seen that at the conclusion of this first Sequence Control State 4, the original contents of the A Register 21 are saved in the Q Register 22, and the contents of the specified Memory storage location Z have been placed in the A Register 21.

Figure 24:
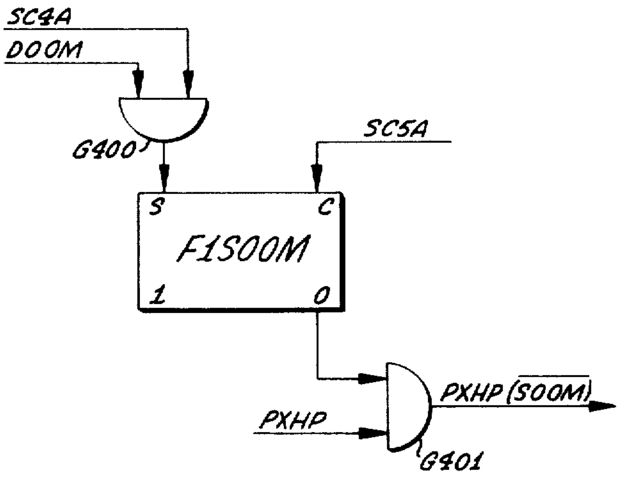
FIGURE 24 is a logical schematic diagram of the logic circuits controlling an OOM Flip-Flop and the derivation of a control signal which is dependent on the state of the OOM Flip-Flop.
Figure 25:
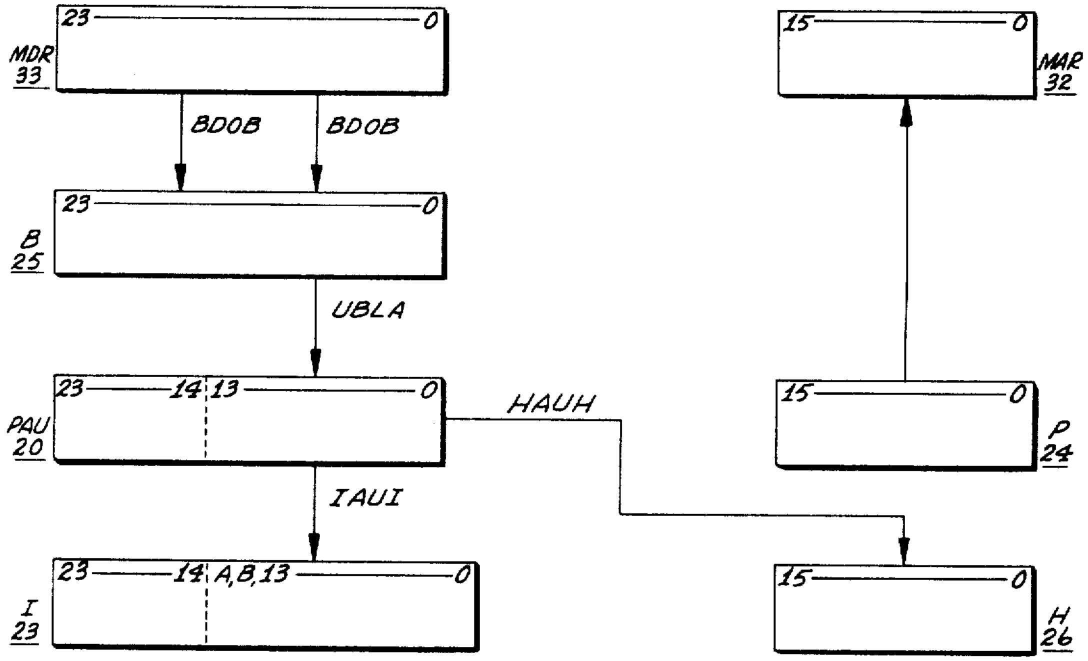
FIGURE 25 is a block diagram showing information flow paths opened in the arithmetic and control unit of FIGURE 5 during a second pass through a first sequence control state during the execution of the OOM command.
Figure 26:
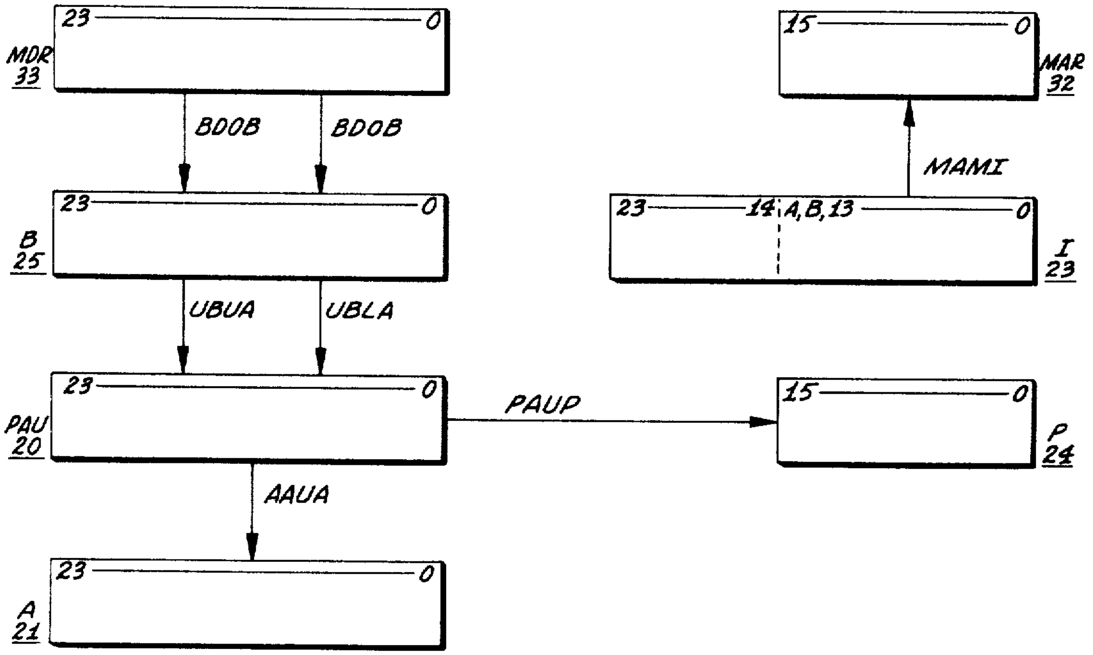
FIGURE 26 is a block diagram showing information flow paths opened in the arithmetic and control unit of FIGURE 5 during a second pass through a fourth sequence control state during execution of the OOM command.
Figure 27:
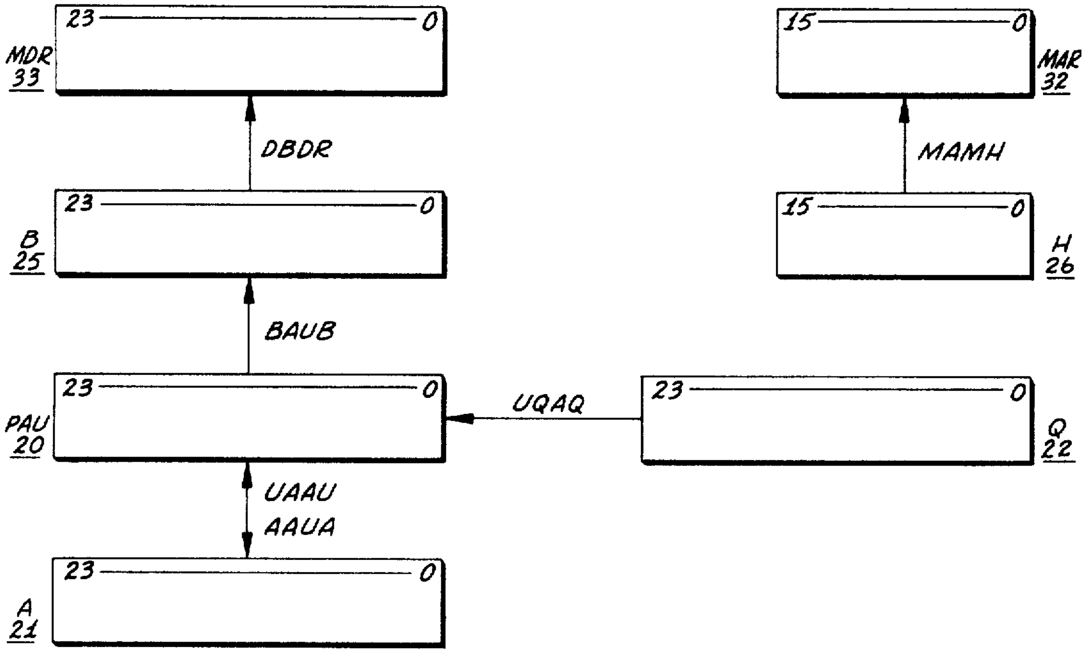
FIGURE 27 is a block diagram showing information flow paths opened in the arithmetic and control unit of FIGURE 5 in a fifth sequence control state during execution of the OOM command.

At the trailing edge of the TLPS of the first Sequence Control State 4, Sequence Control State 1 is reentered to commence the execution of the Operator Instruction. Simultaneously, the F1SOOM Flip-Flop is set by the output signal from an AND gate G400 which has the SC4A and DOOM signals as inputs as shown in FIGURE 24. During this second Sequence Control State 1, Memory is addressed from the P Register 24 because the MAMP signal is "one" as for a normal Sequence Control State 1. Since the P Register 24 was first incremented by a count of one during the first Sequence Control State 1, the Operator Instruction will be fetched from the first sequentail Memory storage location from that in which the OOM instruction is stored. However, as shown in FIGURE 24, the PXHP signal is inhibited from becoming "one" during this second Sequence Control State 1 by the influence of the F1SOOM Flip-Flop in its set state such that the P Register 24 is unchanged at the termination of the second Sequence Control State 1. This control is brought about by applying the PXHP signal as one input to an AND gate G401 which has its other input driven from the "zero" output of the F1SOOM Flip-Flop.

At the trailing edge of TLPS of this second Sequence Control State 1, Sequence Control State 4 is reentered to complete the execution of the Operator Instruction, LDA in this example, and to increment the P Register 24 for a second count of one. At the beginning of the second Sequence Control State 4, the Operator Instruction is in the I Register 23, the contents of Memory storage location Z are in the A Register 21, the original contents of the A Register 21 are preserved in the Q Register 22, and the F1SOOM Flip-Flop remains set. Referring again to the timing diagram FIGURE 22 and to FIGURE 25, the timing signals and the movement of information between the various registers and elements to execute the LDA Operator Instruction are shown.

Figure 22:
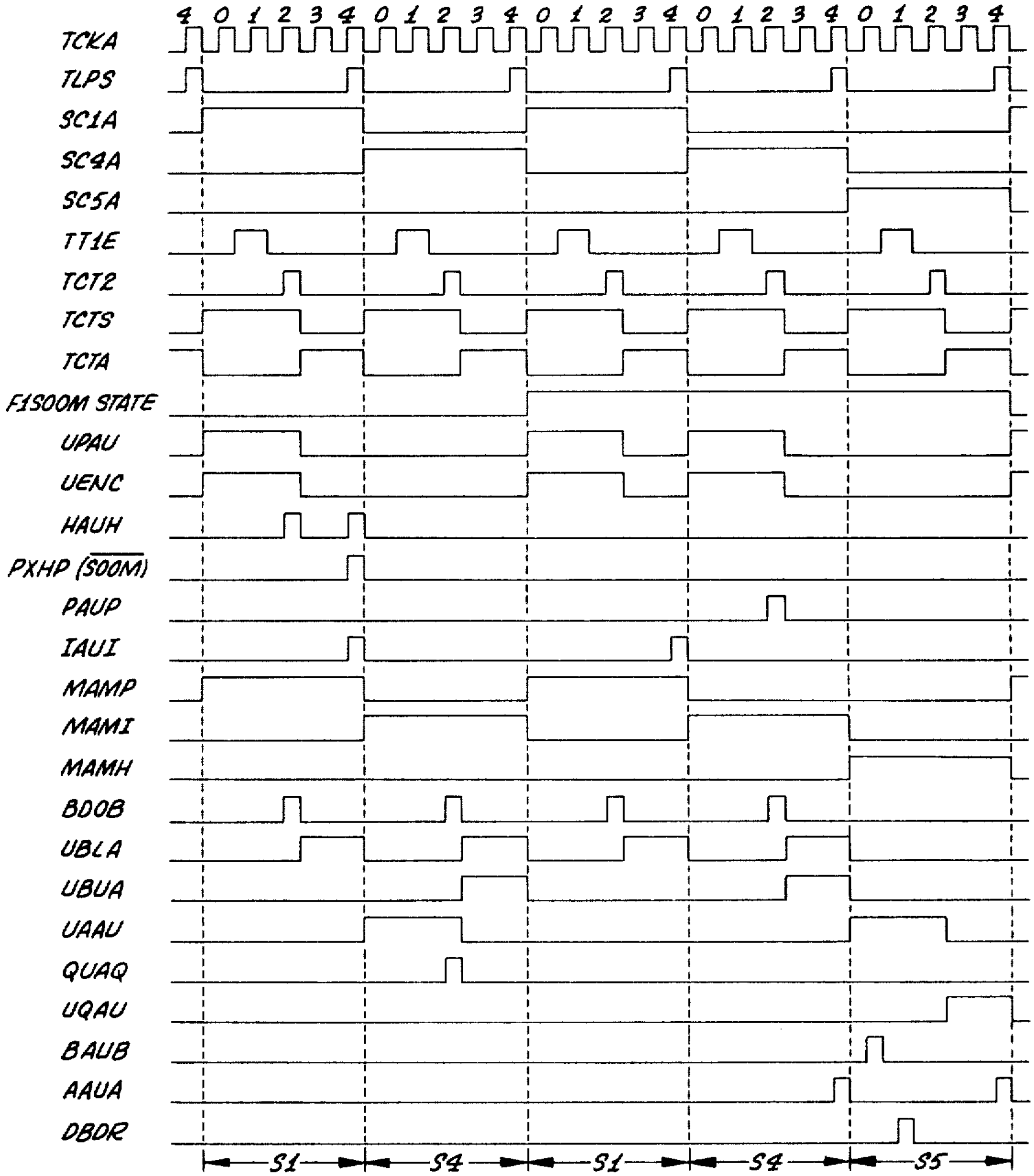
FIGURE 22 is a timing diagram useful in explaining the operation of the apparatus of the invention in executing an OOM command.
Figure 23:
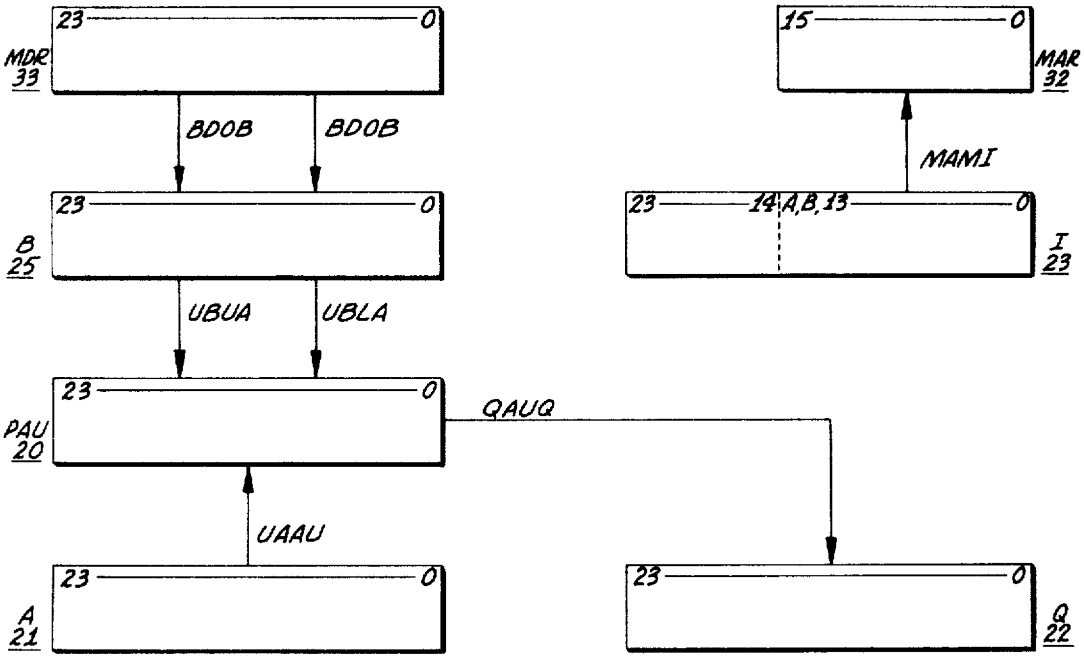
FIGURE 23 is a block diagram showing information flow paths opened in the arithmetic and control unit of FIGURE 5 during a first pass through a fourth sequence control state during execution of the OOM command.

The state of the F1SOOM Flip-Flop is sensed during this second Sequence Control State 4 to permit the requisite second incrementation of the P Register 24 in addition to the normal Sequence Control State 4 functions required to service the Operator Instruction. During TCTA time, the UPAU and UENC signals are "one" to gate the contents of the P Register 24 and a count of one respectively to the PAU 20 to perform the addition in much the manner of a normal Sequence Control State 1. At TCT2 time, however, the PAUP signal becomes "one" as shown in FIGURE 22 to gate the output signals representing the $P+1$ sum from the PAU 20 directly to the P Register 24. It will be observed that this manner of incrementation does not utilize the H Register 26 for temporary storage in the manner of a normal Sequence Control State 1. P Register 24 incrementation.

To implement the LDA command, Memory is addressed from the I Register 23 because the MAMI signal is "one" during the whole of the second Sequence Control State 4. When the information in the Memory storage location specified by the operand address portion of the LDA command word becomes available from the Memory Data Register 33, the BDOB signal becomes "one" to gate the contents of the Memory Data Register 33 to the B Register 25 at TCT2 time. The UBLA and UBUA signals become "one" to gate the contents of the B Register 25 to the PAU 20 during TCTS time, and the AAUA signal gates the output signals from the PAU 20 to the A Register 21.

Following the second Sequence Control State 4, Sequence Control State 5 is initiated. Referring again to the timing diagram, FIGURE 22, and to the Sequence Control State 5 block diagram, FIGURE 26, it will be observed that the UAAU signal is "one" during TCTS time of Sequence Control State 5 to gate the present contents of the A Register 21, which are the manipulated or altered former contents of Z, to the PAU 20. The output signals from the PAU 20 are gated to the B Register 25 by the BAUB signal. Subsequently, during TT1E time and in synchronism with TCKA, the BDBR signal becomes "one" to gate the contents of the B Register 25 to the Memory Data Register 33. During the whole of Sequence Control State 5, Memory is addressed from the H Register 26 which contains the address of the Memory storage location Z because the MAMH signal is "one"; therefore, the contents of the A Register 21 are stored in Memory storage location Z. During TCTA time, the UQAU signal is "one" to gate the contents of the Q Register 22 to the PAU 20, and, at TLPS, the AAUA signal becomes "one" to gate the output signals from the PAU 20 to the A Register 21. The trailing edge of the SC5A signal is utilized to reset the F1SOOM Flip-Flop as shown in FIGURE 24, and Sequence Control State 1 is initiated to fetch the next command of the running program according to the present count in the P Register 24 which will have been incremented twice by counts of one from the address which caused the OOM instruction to be fetched.

It will be recognized that the contents of Memory storage location Z have been utilized as the A Register 21 without disturbing the original contents of the A Register 21. Certain restrictions on the Operator Instruction type are required to insure the results desired. To yield the expected result, the Operator Instruction is nominally limited to Full Operand and Gen I commands which follow the same normal Sequence Control State pattern as the exemplary LDA command. As previously stated, both the OOM instruction and the Operator Instruction can be index modified in the normal manner described in detail above if desired.

What is claimed is:

1. An information processing system comprising memory storage means including a plurality of addressable storage locations for storing a corresponding plurality of words, a first register for temporarily storing the memory address of a command word, addressing means responsive to the memory address in said first register for transferring a command word from the addressed memory storage location to a second register, testing means for testing the command word in said second register for detecting a predetermined configuration, means for generating a signal in response to the detection of the predetermined configuration, third and fourth registers, first means responsive to said signal for transferring the contents of said third register to said fourth register, second means responsive to said signal for modifying the memory address temporarily stored in said first register, third means responsive to said signal for transferring the contents of a memory storage location specified by an operand address portion of the command word temporarily stored in said second register to said third register, fourth means for reactivating said addressing means whereby a second command word is transferred from a memory storage location specified by the modified memory address in said first register to said second register, means for decoding and executing the second command word temporarily stored in said second register, and fifth means responsive to said signal for modifying the memory address temporarily stored in said first register a second time.

2. The information processing system of claim 1 including sixth means responsive to said signal to transfer the contents of said third register to the memory storage location specified by a fifth register subsequent to the execution of the second command and seventh means responsive to said signal to transfer the contents of said fourth register to said third register subsequent to the execution of the second command.

3. An information processing system comprising memory storage means including a plurality of addressable storage locations for storing a corresponding plurality of words, a first register for temporarily storing the memory address of a command word, addressing means responsive to the memory address in said first register for transferring a command word from the addressed memory storage location to a second register, testing means for testing the command word in said second register for detecting a predetermined configuration, means for generating a first signal in response to the detection of the predetermined configuration, third and fourth registers, first means responsive to said first signal for transferring the contents of said third register to said fourth register, second means responsive to said first signal for incrementing the memory address temporarily stored in said first register by a count of one to provide a modified memory address, third means responsive to said first signal for setting a flip-flop, means for testing said flip-flop and generating a second signal if said flip-flop is set, means responsive to said first signal for transferring the contents of a memory storage location specified by an operand address portion of the command word temporarily stored in said second register to said third register, fourth means responsive to said first signal for reactivating said addressing means whereby a second command word is transferred from a memory storage location specified by the modified memory address in said first register to said second register, means for decoding and executing the second command word temporarily stored in said second register, and means responsive to said second signal for incrementing the memory address temporarily stored in said first register by a second count of one.

4. The information processing system of claim 3 including second means responsive to said second signal to transfer the contents of said third register to the memory storage location specified by a fifth register subsequent to the execution of the second command and sixth means responsive to said first signal to transfer the contents of said fourth register to said third register subsequent to the execution of the second command.

References Cited

UNITED STATES PATENTS

| | | | |
|---|---|---|---|
| 3,363,234 | 1/1968 | Erickson et al. | 340—172.5 |
| 3,368,206 | 2/1968 | Herron et al. | 340—172.5 |

PAUL J. HENON, *Primary Examiner.*

RAULFE B. ZACHE, *Assistant Examiner.*